(12) United States Patent
Marrow et al.

(10) Patent No.: US 7,106,437 B2
(45) Date of Patent: Sep. 12, 2006

(54) ON-LINE MEASUREMENT AND CONTROL OF POLYMER PRODUCT PROPERTIES BY RAMAN SPECTROSCOPY

(75) Inventors: David Geoffrey Marrow, Taylor Lake Village, TX (US); Andrew M. Cochran, Farmersville, LA (US); Scott Thomas Roger, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 295 days.

(21) Appl. No.: 10/731,708

(22) Filed: Dec. 9, 2003

(65) Prior Publication Data

US 2004/0133364 A1 Jul. 8, 2004

Related U.S. Application Data

(60) Provisional application No. 60/438,132, filed on Jan. 6, 2003.

(51) Int. Cl.
*G01J 3/44* (2006.01)
*G01N 21/65* (2006.01)

(52) U.S. Cl. ...................................... 356/301
(58) Field of Classification Search ................. 356/301
See application file for complete search history.

(56) References Cited

U.S. PATENT DOCUMENTS

| | | | |
|---|---|---|---|
| 3,725,378 A | 4/1973 | Chamberlin | |
| 3,779,712 A | 12/1973 | Calvert et al. | |
| 4,175,169 A | 11/1979 | Beals et al. | |
| 4,182,810 A | 1/1980 | Willcox | |
| 4,243,619 A | 1/1981 | Fraser et al. | |
| 4,469,853 A | 9/1984 | Mori | |
| 4,540,753 A | 9/1985 | Cozewith et al. | |
| 4,543,399 A | 9/1985 | Jenkins, III et al. | |
| 4,588,790 A | 5/1986 | Jenkins, III et al. | |
| 4,620,049 A | 10/1986 | Schmidt et al. | 585/501 |
| 4,621,952 A | 11/1986 | Aronson | |
| 4,888,704 A | 12/1989 | Topliss et al. | |
| 5,096,634 A | 3/1992 | Tsadares et al. | |
| 5,121,337 A | 6/1992 | Brown | |
| 5,151,474 A | 9/1992 | Lange et al. | 526/60 |
| 5,202,395 A | 4/1993 | Chambon | |

(Continued)

FOREIGN PATENT DOCUMENTS

EP    238 796    9/1987

(Continued)

OTHER PUBLICATIONS

K.R. Beebe et al., "An Introduction to Multivariate Calibration and Analysis," Analytical Chemistry, vol. 59, No. 17, pp. 1007A-1017A, Sep. 1, 1987.

(Continued)

*Primary Examiner*—F. L. Evans
(74) *Attorney, Agent, or Firm*—Andrew B. Griffis

(57) ABSTRACT

Methods are provided for determining and controlling polymer product properties on-line in a slurry reactor system, such as a stirred slurry or slurry loop reactor. The methods include obtaining a regression model for determining a polymer product property, the regression model including principal component loadings and principal component scores, acquiring a Raman spectrum of polymer product in the slurry reactor system, calculating a new principal component score from at least a portion of the Raman spectrum and the principal component loadings, and calculating the polymer product property by applying the new principal component score to the regression model. The property can be controlled by adjusting at least one polymerization parameter based on the calculated polymer product property.

40 Claims, 4 Drawing Sheets

U.S. PATENT DOCUMENTS

| | | | |
|---|---|---|---|
| 5,270,274 A | 12/1993 | Hashiguchi et al. | ........ 502/115 |
| 5,274,056 A | 12/1993 | McDaniel et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,462,999 A | 10/1995 | Griffin et al. | |
| 5,589,555 A | 12/1996 | Zboril et al. | |
| 5,638,172 A | 6/1997 | Alsmeyer et al. | |
| 5,675,253 A | 10/1997 | Smith et al. | |
| 5,678,751 A | 10/1997 | Buchanan et al. | |
| 5,682,309 A | 10/1997 | Bartusiak et al. | |
| 5,696,213 A | 12/1997 | Schiffino et al. | |
| 5,864,403 A | 1/1999 | Ajji et al. | |
| 5,892,228 A | 4/1999 | Cooper et al. | ......... 250/339.12 |
| 5,999,255 A | 12/1999 | Dupee et al. | ................ 356/301 |
| 6,072,576 A | 6/2000 | McDonald et al. | |
| 6,144,897 A | 11/2000 | Selliers | ....................... 700/269 |
| 6,204,344 B1 | 3/2001 | Kendrick et al. | |
| 6,204,664 B1 | 3/2001 | Sardashti et al. | |
| 6,218,484 B1 | 4/2001 | Brown et al. | |
| 6,228,793 B1 | 5/2001 | Hosaka et al. | |
| 6,239,235 B1 | 5/2001 | Hottovy et al. | |
| 6,281,300 B1 | 8/2001 | Kendrick | |
| 6,380,325 B1 | 4/2002 | Kendrick | |
| 6,405,579 B1 | 6/2002 | Tjahjadi et al. | |
| 6,479,597 B1 | 11/2002 | Long et al. | ................... 526/59 |
| 6,673,878 B1 | 1/2004 | Donck | |
| 2002/0156205 A1 | 10/2002 | Long et al. | |
| 2004/0198927 A1 | 10/2004 | Battiste | |
| 2004/0233425 A1 | 11/2004 | Long et al. | |
| 2004/0266959 A1 | 12/2004 | Heslop et al. | |
| 2005/0154155 A1 | 7/2005 | Battiste | |

FOREIGN PATENT DOCUMENTS

| | | |
|---|---|---|
| EP | 257 316 A1 | 3/1988 |
| EP | 257 316 B1 | 3/1988 |
| EP | 328 826 | 8/1989 |
| EP | 561 078 | 9/1993 |
| EP | 406 805 | 12/1995 |
| EP | 0561078 B1 | 4/1997 |
| JP | 02038841 | 8/1990 |
| WO | WO 94/21962 | 9/1994 |
| WO | WO 96/41822 | 12/1996 |
| WO | WO 98/08066 | 2/1998 |
| WO | WO 99/01750 | 1/1999 |
| WO | WO 01/09201 | 2/2001 |
| WO | WO 01/09203 | 2/2001 |
| WO | WO 2004/063234 | 7/2004 |
| WO | WO 2005/049663 | 6/2005 |

OTHER PUBLICATIONS

J. M. Tedesco et al., "Calibration of dispersive Raman Process Analyzers," The Society Of Photo-Optical Instrumentation Engineers, vol. 3537, pp. 200-212, 1999.

G.A. Bakken et al., "Examination of Criteria for Local Model Principal Component Regression," Society for Applied Spectroscopy, vol. 51, No. 12, pp. 1814-1822, 1997.

P. Erlich et al., "Fundamentals of the Free-Radical Polymerization of Ethylene," Advanced Polymer Science, vol. 7, pp. 386-448, 1970.

M.L. Myrick et al., "In Situ Fiber-Optic Raman Spectroscopy of Organic Chemistry in a Supercritical Water Reactor," Journal of Raman Spectroscopy, vol. 25, pp. 59-65, 1994.

T. Naes et al., "Locally Weighted Regression and Scatter Correction for Near-Infrared Reflectance Data," Analytical Chemistry, vol. 62, pp. 664-673, 1990.

J.J. Zacca et al., "Modelling of the Liquid Phase Polymerization of Olefins in Loop reactors," Chemical Engineering Science, vol. 48, No. 22, pp. 3743-3765, 1993.

L.P. Russo et al., "Moving-Horizon State Estimation Applied to an Industrial Polymereization Process," American Control Conf. Proc., San Diego, CA, 1999.

H. Martens et al., "*Multivariate Calibration*," Wiley & Sons Ltd., pp. vii-ix, 1989.

*Multivariate Data Analysis for Windows—Version 3.0*, excerpted from Pirouette Software Manual, Exploratory Analysis: Principal Component Analysis, pp. 5-13 through 5-40, 1985-2000.

E.P.C. Lai et al., "*Noninvasive Spectroscopic Detection of Bulk Polymerization by Stimulated Raman Scattering*," Applied Spectroscopy, vol. 48, No. 8, 1994.

S. Sekulic et al., "*Nonlinear Multivariate Calibration Methods in Analytical Chemistry*," Analytical Chemistry, vol. 65, No. 19, pp. 835A-845A, Oct. 1, 1993.

E.D. Lipp et al., "*On-Line Monitoring Of Chlorosilane Streams By Raman Spectroscopy*," Reprinted from Applied Spectroscopy, vol. 52, No. 1, Jan., 1998.

D.R. Battiste et al., "*On-Line Raman Analysis of Ethylene and Hexene in the Phillips I-Hexene and Polyethylene Processes*," Gulf Coast Conference presentation (Abstract).

M.J. Pelletier et al.; "*Optical fibers enable Raman instruments to analyze industrial process problems quickly and accurately*," Raman Spectroscopy—Keeps Industry Under Control, Reprint: Photonics Spectra, 4 pgs., Oct., 1997.

V. Centner et al., "*Optimization in Locally Weighted Regression*," Analytical Chemistry, vol. 70, No. 19, pp. 4206-4211, Oct. 1, 1998.

"*Principal Components Analysis*," excerpted from PLS_Toolbox, Version 2.0 Data Analysis Manual, Eigenvector Research, Inc., pp. 32-34, 1998.

L. Markwort et al., "*Raman Imaging of Heterogeneous Polymers: A Comparison of Global versus Point Illumination*," Applied Spectroscopy, vol. 49, No. 10, pp. 1411-1430, 1995.

I. Modric et al., "*Raman- und Infrarotspektren isotaktischer Polyalkylathylene*\*," Colloid & Polymer Sci., vol. 254, pp. 342-347, 1976.

M.G. Hansen et al., "*Real-Time Monitoring of Industrial Polymers*," Raman Review; pp. 1-4, Mar. 1998.

S.E. Nave "*Rugged Fiber Optic Probes and Sampling Systems for Remote Chemical analysis Via the Raman Technique*," ISA, Paper #96-042, pp. 453-467, 1996.

M.J. Pelletier et al., "*Shining a Light on Wet Process Control*," Semiconductor International, 4 pages, Mar. 1996.

K.P.J. Williams et al., "*Use of Micro Raman Spectroscopy for the Quantitative Determination of Polyethylene Density Using Partial Least-Squares Calibration*," Journal of Raman Spectroscopy, vol. 26, pp. 427-433, 1995.

Ardell, George G., et al., Model Prediction for Reaction Control, Chemical Engineering Progress, American Institute of Chemical Engineers, vol. 79, No. 6, pp. 77-83 (Jun. 1, 1983).

J.M. Tedesco et al., "Calibration of dispersive Raman process analyzers," Part of the SPIE Conference on Online Chemical Process Monitoring w/ Advanced Techniques, SPIE, vol. 3537, pp. 200-212, Nov. 1998.

A.C. Ouano et al., "Gel Permeation Chromatography," Polymer Molecular Weights Part II, Chapter 6, pp. 287-378, 1975.

Verstrate et al., "Near Monodisperse Ethylene-Propylene Copolymers by Direct Ziegler-Natta Polymerization. Preparation, Characterization, Properties," Macromolecules, vol. 21, pp. 3360-3371, 1988.

F. Rodriguez, "Principles of Polymer Systems 3rd Ed.," Hemisphere Pub. Corp., NY, pp. 155-160, 1989.

ON-LINE MEASUREMENT AND CONTROL OF POLYMER PRODUCT PROPERTIES BY RAMAN SPECTROSCOPY

1. CROSS-REFERENCE TO RELATED APPLICATIONS

The present application claims the benefit of U.S. Provisional Application No. 60/438,132, filed Jan. 6, 2003, said application incorporated herein by reference.

2. FIELD OF THE INVENTION

The present invention is directed generally to methods of measuring polymer product properties on-line in a slurry reactor, and using those measured properties to control the polymerization reaction. In particular, the present invention provides methods of measuring properties of polyolefins such as melt index and density on-line, using Raman spectroscopy, and methods of controlling a reactor using real-time, on-line polymer product property data provided by Raman spectroscopic measurements.

3. BACKGROUND

Slurry processes for the homopolymerization and copolymerization of monomers, especially olefin monomers, are well known in the art. Such processes can be conducted, for example, by introducing the monomer or monomers into a stirred and/or circulated stream of resin particles, catalyst and diluent. As used herein, the term "slurry reactor" includes any reactor suitable for polymerizing monomers in a heterogeneous medium including diluent (solution phase) and polymer product (solid phase), such as a stirred slurry reactor or a slurry loop reactor. As used herein, the term "slurry reactor system" includes the slurry reactor and associated recycle systems and product drying and recovery systems.

The properties of the polymer produced in a slurry reactor system are affected by a variety of operating parameters, such as temperatures, monomer feed rates, slurry density, and catalyst feed rates. In order to produce polymer having a desired set of properties, such as melt index and density, polymer product exiting the reactor is conventionally sampled and laboratory measurements carried out to characterize the polymer product. If it is discovered that one or more polymer product properties are outside a desired range, polymerization conditions can be adjusted, and the polymer product resampled. This periodic sampling, testing and adjusting, however, is undesirably slow, since sampling and laboratory testing of polymer product properties such as melt index, molecular weight distribution, and density is time-consuming. As a result, conventional processes can produce large quantities of "off-spec" polymer product before manual testing and control can effectively adjust the polymerization conditions. This occurs during production of a particular grade of resin as well as during the transition process between grades.

Methods have been developed to attempt to provide rapid assessment of certain polymer properties and rapid adjustment of polymerization conditions. PCT publications WO 01/09201 and WO 01/09203 disclose Raman-based methods using principal components analysis (PCA) and partial least squares (PLS) to determine concentrations of components in a slurry reactor. The concentration of a particular component, such as ethylene or hexene, is determined based on measurements of a known Raman peak corresponding to the component. U.S. Pat. No. 5,999,255 discloses a method for measuring a physical property of a polymer sample, preferably nylon, by measuring a portion of a Raman spectrum of the polymer sample, determining a value of a preselected spectral feature from the Raman spectrum, and comparing the determined value to reference values. This method relies on identification and monitoring of preselected spectral features corresponding to identified functional groups, such as NH or methyl, of the polymer.

Additional background information can be found in U.S. Pat. Nos. 6,479,597, 6,144,897 and 5,151,474; European Patent application EP 0 561 078; PCT publication WO 98/08066; and Ardell, G. G. et al., "Model Prediction for Reactor Control," *Chemical Engineering Progress*, American Institute of Chemical Engineers, U.S., vol. 79, no. 6, Jun. 1, 1983, pages 77–83 (ISSN 0360-7275).

It would be desirable to have methods of determining polymer product properties such as melt index, density, molecular weight distribution, and tab swell, on-line in a slurry reactor system, without the need to preselect or identify spectral features of a polymer to monitor. It would also be desirable to have methods of controlling a slurry reactor system to maintain desired polymer product properties, based on a rapid, on-line determination of the polymer product properties.

4. SUMMARY OF THE INVENTION

In one aspect, the present invention provides a process for determining polymer product properties in a slurry reactor system. The process includes obtaining a regression model for determining a polymer product property, the regression model including principal component loadings and principal component scores, acquiring a Raman spectrum of the polymer product in the slurry reactor system, calculating a new principal component score from at least a portion of the Raman spectrum and the principal component loadings, and calculating the polymer product property by applying the new principal component score to the regression model.

In another aspect, the present invention provides a process for controlling polymer product properties in a slurry reactor system. The process includes obtaining a regression model for determining a polymer product property, the regression model including principal component loadings and principal component scores, acquiring a Raman spectrum of the polymer product in the slurry reactor system, calculating a new principal component score from at least a portion of the Raman spectrum and the principal component loadings, calculating the polymer product property by applying the new principal component score to the regression model, and adjusting at least one polymerization parameter based on the calculated polymer product property. In particular embodiments, the at least one polymerization parameter can be, for example, monomer feed rate, comonomer feed rate, catalyst feed rate, cocatalyst feed rate, slurry density (solids concentration in the slurry), hydrogen gas feed rate, or reaction temperature.

In one embodiment, the regression model is constructed by obtaining a plurality of Raman spectra of polymer product samples, calculating principal component loadings and principal component scores from the spectra using principal component analysis (PCA), and forming the regression model using the principal component scores such that the regression model correlates the polymer product property to the principal component scores.

In another embodiment, the regression model is a locally weighted regression model.

In another embodiment, the method includes: obtaining a first regression model for determining a first property of the polymer product, the first regression model including first principal component loadings and first principal component scores; obtaining a second regression model for determining a second property of the polymer product, the second regression model including second principal component loadings and second principal component scores; acquiring a Raman spectrum of the polymer product in a slurry reactor system; calculating a new first principal component score from at least a portion of the Raman spectrum and the first principal component loadings; calculating a new second principal component score from at least a portion of the Raman spectrum and the second principal component loadings; calculating the first property of the polymer product by applying the new first principal component score to the first regression model; and calculating the second property of the polymer product by applying the new second principal component score to the second regression model.

Suitable polymer properties include, for example, density, melt flow rates such as melt index or flow index, molecular weight, molecular weight distribution, tab swell, and various functions of such properties.

5. BRIEF DESCRIPTION OF THE DRAWINGS

6. DETAILED DESCRIPTION

Figure 1:
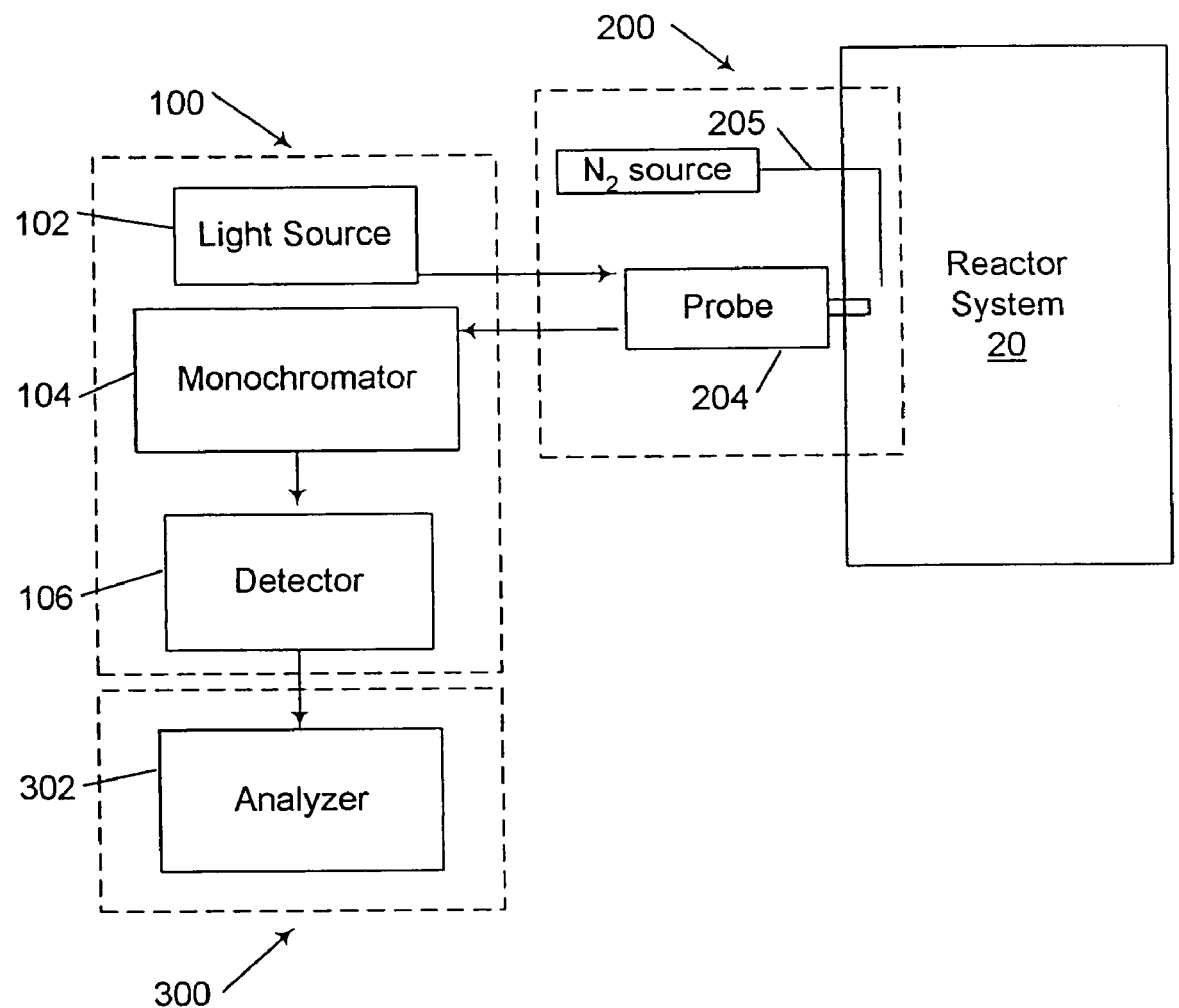
FIG. 1 is a block diagram of a Raman analyzer according to the invention.

In one embodiment, the present invention provides a method of determining polymer product properties on-line, i.e., as the polymer product is produced in a slurry reactor system, without the need for external sampling and analysis. The method includes obtaining a regression model for determining a polymer product property, the regression model including principal component loadings and principal component scores, acquiring a Raman spectrum of the polymer product in the slurry reactor system, calculating a new principal component score from at least a portion of the Raman spectrum and the principal component loadings, and calculating the polymer product property by applying the new principal component score to the regression model.

6.1 Slurry Reactor System

The methods of the invention can generally be carried out in a slurry reactor system, such as a stirred slurry reactor system or a slurry loop reactor system. For illustrative purposes, the methods are described below with particular reference to a slurry loop reactor system. However, it should be appreciated that the methods are not limited to this particular reactor configuration.

A slurry loop reactor can generally be described as a loop-shaped or multiple loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In the slurry loop reactor, the polymerization medium includes monomer, optional comonomer, and a hydrocarbon solvent or diluent, advantageously aliphatic paraffin such as propane, isobutane, hexane, heptane, or cyclohexane, for example, or an aromatic diluent such as toluene, or mixtures thereof. The polymerization typically is carried out at a temperature of from a lower limit of 50 or 60 or 70 or 80 or 90 C to an upper limit of 150 or 140 or 130 or 120 or 110 or 100 C, with ranges from any lower limit to any upper limit being contemplated. Pressures typically can vary from about 100 to about 700 psia (0.69–4.8 MPa). Additional description is given in U.S. Pat. Nos. 5,274,056 and 4,182,810 and PCT publication WO 94/21962. As such, the reactor constituents generally are a combination of both solids, such as supported catalyst and polymer product, and liquids, such as those described above. The percentage of solids within the reactor constituents may be as high as 60 wt % of the reactor constituents. Typically, the weight percent of solids is in the range of 45 to 55 wt. %.

The slurry loop reactor may be operated in a single stage process or in multistage processes. In multistage processing, the polymerization is carried out in two or more reactors. These reactors can be configured in series, in parallel, or a combination thereof.

A slurry reactor system includes the slurry reactor and associated product recovery systems. Polymer product is continuously or intermittently discharged from the slurry reactor as a slurry including polymer product, diluent, and unreacted or under-reacted monomer. Polymer product is then recovered from the product slurry, and other slurry components removed and/or recycled, using conventional methods well-known in the art. Typically, the product slurry is conveyed to a high-pressure flash tank to concentrate the polymer solids, which are then conveyed to a lower-pressure flash tank to further concentrate the solids. The solids exiting the lower-pressure flash tank can then be further dried, such as by heating in a polymer drier, and conveyed through a final purge column to yield a dried, particulate polymer product.

Suitable slurry reactor systems are well-known in the art and are described, for example, in U.S. Pat. Nos. 6,204,344; 6,281,300; 6,380,325; and 6,239,235.

In particular methods of the present invention, the slurry reactor system is operated to form at least one polyolefin homopolymer or copolymer product. Suitable polyolefins include any polyolefin homopolymer or copolymer that can be produced in a slurry reactor system.

In one embodiment, the at least one polyolefin includes polyethylene homopolymer and/or copolymer. In a particular aspect of this embodiment, the polyethylene is a high density polyethylene ("HDPE"), i.e., a polyethylene homopolymer or copolymer having a density of at least 0.935 g/cm$^3$ or at least 0.940 g/cm$^3$ or at least 0.945 g/cm$^3$. HDPEs can be produced in a slurry reactor using, for example, Ziegler-Natta catalysts, chromium catalysts, or metallocene catalysts.

In another embodiment, the at least one polyolefin includes polypropylene homopolymer or copolymer. In this embodiment, the slurry diluent can be liquid propylene monomer.

Polymers having more than two types of monomers, such as terpolymers, are also included within the terms "polymer" or "copolymer" as used herein. Suitable comonomers include α-olefins, such as $C_3$–$C_{20}$ α-olefins or $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful commoners include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the polymer and the specific comonomers selected. One skilled in the art can readily determine the appropriate comonomer content appropriate to produce a polymer having a desired density.

6.2 Raman Spectroscopy

Raman spectroscopy is a well-known analytical tool for molecular characterization, identification, and quantification. Raman spectroscopy makes use of inelastically scattered radiation from a non-resonant, non-ionizing radiation source, typically a visible or near-infrared radiation source such as a laser, to obtain information about molecular vibrational-rotational states. In general, non-ionizing, non-resonant radiation is scattered elastically and isotropically (Raleigh scattering) from a scattering center, such as a molecule. Subject to well-known symmetry and selection rules, a very small fraction of the incident radiation can be inelastically and isotropically scattered, with each inelastically scattered photon having an energy $E = h\nu_0 \pm |E_{i',j'} - E_{i,j}|$, where $h\nu_0$ is the energy of the incident photon and $|E_{i',j'} - E_{i,j}|$ is the absolute difference in energy between the final $(i',j')$ and initial $(i,j)$ vibrational-rotational states of the molecule. This inelastically scattered radiation is the Raman scattering, and includes both Stokes scattering, where the scattered photon has lower energy than the incident photon ($E = h\nu_0 - |E_{i',j'} - E_{i,j}|$), and anti-Stokes scattering, where the scattered photon has higher energy than the incident photon ($E = h\nu_0 + |E_{i',j'} - E_{i,j}|$).

Raman spectra are typically shown as plots of intensity (arbitrary units) versus "Raman shift," where the Raman shift is the difference in energy or wavelength between the excitation radiation and the scattered radiation. The Raman shift is typically reported in units of wavenumbers ($cm^{-1}$), i.e., the reciprocal of the wavelength shift in centimeters. Energy difference $|E_{i',j'-Ei,j}|$ and wavenumbers ($\omega$) are related by the expression $|E_{i',j'-Ei,j}| = hc\omega$, where h is Planck's constant, c is the speed of light in cm/s, and $\omega$ is the reciprocal of the wavelength shift in centimeters.

The spectral range of the Raman spectrum acquired is not particularly limited, but a useful range includes Raman shifts (Stokes and/or anti-Stokes) corresponding to a typical range of polyatomic vibrational frequencies, generally from about 100 $cm^{-1}$ to about 4000 $cm^{-1}$. It should be appreciated that useful spectral information is present in lower and higher frequency regions. For example, numerous low frequency molecular modes contribute to Raman scattering in the region below 100 $cm^{-1}$ Raman shift, and overtone vibrations (harmonics) contribute to Raman scattering in the region above 4000 $cm^{-1}$ Raman shift. Thus, if desired, acquisition and use of a Raman spectrum as described herein can include these lower and higher frequency spectral regions.

Conversely, the spectral region acquired can be less than all of the 100 $cm^{-1}$ to 4000 $cm^{-1}$ region. For many polymers, such as polyolefins, the majority of Raman scattering intensity will be present in a region from about 500 $cm^{-1}$ to about 3500 $cm^{-1}$ or from 1000 $cm^{-1}$ to 3000 $cm^{-1}$. The region acquired can also include a plurality of sub-regions that need not be contiguous.

As explained below, it is a particular advantage of the methods described herein that Raman scattering intensity data is useful in determining properties of polymer particles without the need to identify, select, or resolve particular spectral features. Thus, it is not necessary to identify a particular spectral feature as being due to a particular mode of a particular moiety of the polymer, nor is it necessary to selectively monitor Raman scattering corresponding to a selected spectral feature. Indeed, it has been surprisingly found that such selective monitoring disadvantageously disregards a wealth of information content embedded in the spectrum that, heretofore, has generally been considered to be merely unusable scattering intensity disposed between and underlying the identifiable (and thus presumed useful) bands. Accordingly, in the methods described herein, the Raman spectral data acquired and used includes a plurality of frequency or wavelength shift, scattering intensity (x, y) measurements over relatively broad spectral regions, including regions conventionally identified as spectral bands and regions conventionally identified as interband, or unresolved regions.

The frequency spacing of acquired data can be readily determined by one skilled in the art, based on considerations of machine resolution and capacity, acquisition time, data analysis time, and information density. Similarly, the amount of signal averaging used is readily determined by one skilled in the art based on machine and process efficiencies and limitations.

The spectral region measured can include Stokes scattering (i.e., radiation scattered at frequencies lower than the excitation frequency), anti-Stokes scattering (i.e., radiation scattered at frequencies higher than the excitation frequency), or both. Optionally, polarization information embedded in the Raman scattering signal can also be used, and one skilled in the art readily understands how to acquire Raman polarization information. However, determining polymer properties as described herein does not require the use of polarization information. In some embodiments described herein, any Raman polarization is essentially randomized as a result of interactions with the fiber optic conduit used to convey the signal to the signal analyzer, as described below.

6.3 Raman Instrumentation

Referring now to FIG. 1, the instrumentation used to collect and process Raman data includes a Raman subsystem 100, a sample subsystem 200, and a data subsystem 300. As shown in FIG. 1, the sample subsystem 200 is in optical communication with slurry reactor system 20; i.e., the instrumentation is configured to allow excitation radiation and scattered radiation to pass between the sample subsystem 200 and the slurry reactor 20 such as, for example, by using fiber optic cables and associated optics.

6.3.1 Raman Subsystem

The Raman subsystem includes a Raman spectrometer, the principal components of which are an excitation source 102, a monochromator 104, and a detector 106. Raman spectrometers are well-known analytical instruments, and thus only a brief description is provided herein.

A Raman spectrometer includes an excitation source 102 which delivers excitation radiation to the sample subsystem 200. Scattered radiation is collected within the sample subsystem 200 (described below), filtered of Raleigh scattered light, and dispersed via monochromator 104. The dispersed Raman scattered light is then imaged onto a detector 106 and subsequently processed in data subsystem 300, as further described below.

Excitation Source

The excitation source and frequency can be readily determined based on considerations well-known in the art. Typically, the excitation source 102 is a visible or near infrared laser, such as a frequency-doubled Nd:YAG laser (532 nm), a helium-neon laser (633 nm), or a solid-state diode laser (such as 785 nm). The laser can be pulsed or continuous wave (CW), polarized as desired or randomly polarized, and preferably single-mode. Typical excitation lasers will have 100 to 400 mW power (CW), although lower or higher power can be used as desired. Light sources other than lasers can be used, and wavelengths and laser types and parameters other than those listed above can also be used. It is well-known that scattering, including Raman scattering, is proportional to the fourth power of the excitation frequency, subject to the practical limitation that fluorescence typically overwhelms the relatively weak Raman signal at higher frequencies. Thus, higher frequency (shorter wavelength) sources are preferred to maximize signal, while lower frequency (longer wavelength) sources are preferred to minimize fluorescence. One skilled in the art can readily determine the appropriate excitation source based on these and other considerations, such as mode stability, maintenance time and costs, capital costs, and other factors well understood in the art.

The excitation radiation can be delivered to the sample subsystem 200, and the scattered radiation collected from the sample subsystem, by any convenient means known in the art, such as conventional beam manipulation optics, or fiber optic cables. For an on-line process measurement, it is particularly convenient to deliver the excitation radiation and collect the scattered radiation fiber-optically. It is a particular advantage of Raman spectroscopy that the excitation radiation typically used is readily manipulated fiber optically, and thus the excitation source can be positioned remotely from the sampling region. A particular fiber optic probe is described below; however, one skilled in the art will appreciate that the Raman system is not limited to any particular means of radiation manipulation.

Monochromator

The scattered radiation is collected and dispersed by any convenient means known in the art, such as a fiber optic probe as described below. The collected scattered radiation is filtered to remove Raleigh scattering and optionally filtered to remove fluorescence, then frequency (wavelength) dispersed using a suitable dispersive element, such as a blazed grating or a holographic grating, or interferometrically (e.g., using Fourier transforms). The grating can be fixed or scanning, depending upon the type of detector used. The monochromator 104 can be any such dispersive element, along with associated filters and beam manipulation optics.

Detector

The dispersed Raman scattering is imaged onto a detector 106. The choice of detector is easily made by one skilled in the art, taking into account various factors such as resolution, sensitivity to the appropriate frequency range, response time, etc. Typical detectors include array detectors generally used with fixed-dispersive monochromators, such as diode arrays or charge coupled devices (CCDs), or single element detectors generally used with scanning-dispersive monochromators, such as lead sulfide detectors and indium-gallium-arsenide detectors. In the case of array detectors, the detector is calibrated such that the frequency (wavelength) corresponding to each detector element is known. The detector response is delivered to the data subsystem 300 which generates a set of frequency shift, intensity (x,y) data points which constitute the Raman spectrum.

6.3.2 Sample Subsystem

The sample subsystem 200 couples the Raman subsystem 100 to the polymerization process. Thus, the sample subsystem 200 delivers the excitation radiation from the excitation source 102 to the polymer product, collects the scattered radiation, and delivers the scattered radiation to the monochromator 104.

As noted above, the excitation radiation can be delivered to and collected from the polymer product by any convenient means, such as using conventional optics or fiber optic cables.

Figure 2:
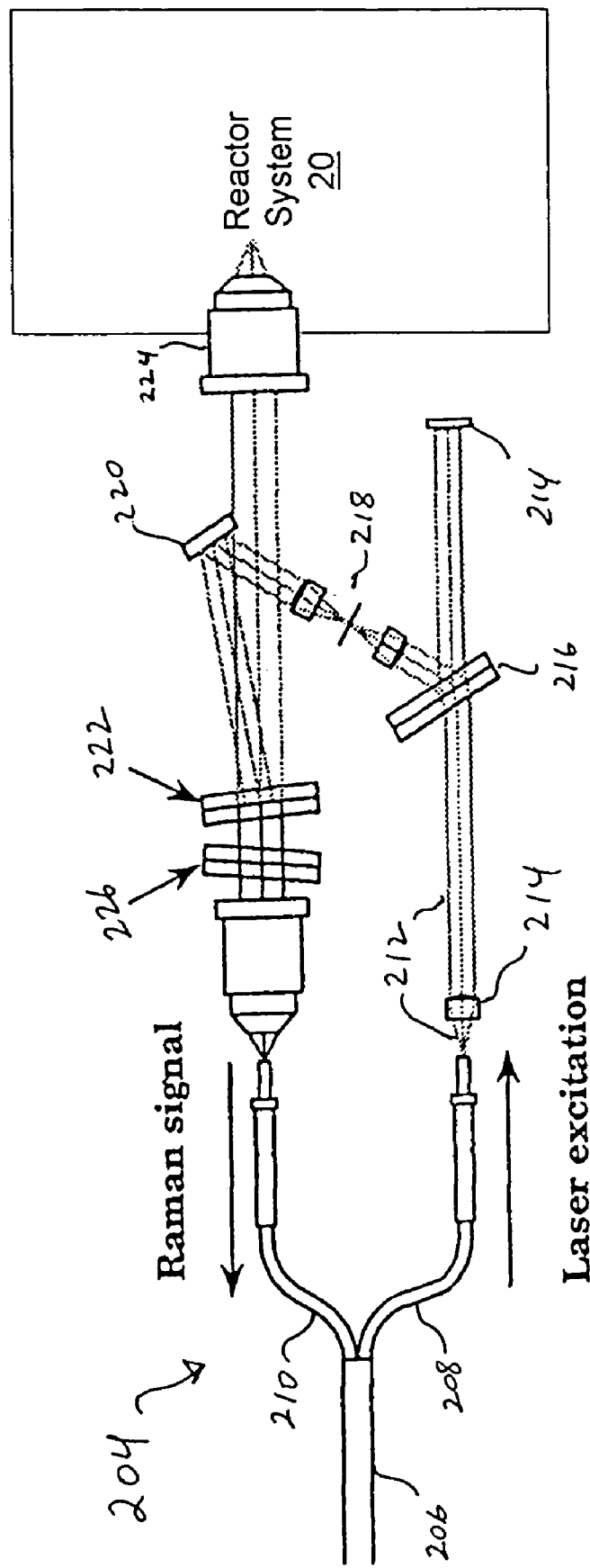
FIG. 2 illustrates one embodiment of a fiber optic Raman probe.

In one embodiment, the sample subsystem includes a probe 204. FIG. 2 shows a block diagram of one embodiment of a fiber optic probe. The probe includes a fiber optic bundle 206 including one or more fiber optic cables 208 carrying the excitation radiation from the excitation source toward the polymer product, and one or more fiber optic cables 210 carrying the collected scattered radiation from the polymer product. Fiber optic cables 208 are in optical communication with the excitation source (102 in FIG. 1), and fiber optic cables 210 are in optical communication with the monochromator (104 in FIG. 1). The excitation and scattered radiation can be manipulated using well-known techniques. Thus, it should be appreciated that the particular optical setup shown in FIG. 2 is merely exemplary. Excitation radiation 212 is directed via optics 214 to a holographic grating 216 and spatial filter 218 to remove silica Raman due to the fiber optic cable, then directed via mirror 220 and beam combiner 222 to sampling optics (not shown) within probe head 224. Probe head 224 is disposed in a polymer product stream in slurry reactor system 20, eliminating the need for complex sampling apparatus. Scattered radiation is collected via the sampling optics and directed through beam combiner 222, a notch filter 226 to remove the Raleigh scattered radiation, and into fiber optic cables 210.

The probe head 224 can be disposed at any convenient location in the slurry reactor system. Thus, for example, in one embodiment, the probe head 224 is positioned in an output conduit of the slurry reactor. In other embodiments, the probe head 224 is positioned in the product flowstream downstream of a high-pressure flash tank, downstream of a low-pressure flash tank, or downstream of a purge column.

In operation, static charge may build-up on the probe head 224. An optional grounding strap, not shown, can be used to ground the probe head 224 to the slurry reactor system 20, to dissipate static charge.

Preferably, an inert gas flow is provided via conduit 205. The inert gas, such as nitrogen gas, is directed via conduit 205 to provide a gas flow across the probe head 224 to reduce the incidence of probe fouling by polymer particle agglomeration on the probe head.

The polymer product includes a plurality of polymer particles (granules). Advantageously, it is not necessary that the polymer product be free of liquid-phase components, such as residual diluent or other liquid hydrocarbons that may be present in the polymer product.

6.3.3 Data Subsystem

Referring again to FIG. 1, the data subsystem includes an analyzer 302, which receives the response signal of the detector 106. The analyzer can be, for example, a computer capable of storing and processing the Raman data. Other functions of the analyzer can include, for example, developing the regression model and carrying out PCA/LWR analysis, as described below. In one embodiment described above, the data subsystem controls the motion of the sampling probe. In another embodiment described above, the data subsystem controls valves for filling and emptying the sample chamber. In another embodiment, the data subsystem compares the calculated value of one or more polymer properties to a target value, and adjusts one or more reactor parameters in response to the deviation between calculated and target values. Reactor control is further described below.

6.4 PCA/LWR Analysis

The Raman spectrum includes information directly or indirectly related to various properties of the polymer product. Conventionally, sample components are identified by the presence of unique spectral signatures, such as particular bands recognized as being due to particular vibrational modes of a molecule. Quantitative information such as concentration can then be obtained about a sample component by, for example, integrating the area under a particular peak and comparing the area to a calibration sample, by monitoring scattered intensity at a particular peak as a function of time, etc. In contrast to these conventional approaches, the present inventors have surprisingly found that polymer properties can be determined from Raman spectra without the need to identify or select particular spectral features, by using a multivariate model to correlate polymer properties with Raman scattering data. The model uses large, contiguous regions of the spectrum, rather than discrete spectral bands, thereby capturing large amounts of information density unavailable and unrecognized in conventional analysis. Further, the spectral data are correlated to polymer properties such as melt flow rates (defined below), densities, molecular weight distributions, tab swell, etc., that are not readily apparent from optical spectra.

In one embodiment, the data analysis described below is used to build and apply a predictive model for at least one property of the polymer product selected from melt flow rate, density, molecular weight, molecular weight distribution, tab swell, and functions thereof.

As used herein, the term "melt flow rate" indicates any of the various quantities defined according to ASTM D-1238, including $I_{2.16}$, the melt flow rate of the polymer measured according to ASTM D-1238, condition E (2.16 kg load, 190° C.), commonly termed the "melt index", and $I_{21.6}$, the melt flow rate of the polymer measured according to ASTM D-1238, condition F (21.6 kg load, 190° C.), commonly termed the "flow index." Other melt flow rates can be specified at different temperatures or different loads. The ratio of two melt flow rates is the "Melt Flow Ratio" or MFR, and is most commonly the ratio of $I_{21.6}/I_{2.16}$. "MFR" can be used generally to indicate a ratio of melt flow rates measured at a higher load (numerator) to a lower load (denominator).

As used herein, "molecular weight" indicates any of the moments of the molecular weight distribution, such as the number average, weight average, or Z-average molecular weights, and "molecular weight distribution" indicates the ratio of two such molecular weights. In general, molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. These and higher moments are included in the term "molecular weight." The desired molecular weight distribution (MWD) function (such as, for example, Mw/Mn or Mz/Mw) is the ratio of the corresponding M values. Measurement of M and MWD by conventional methods such as gel permeation chromatography is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems 3rd ed.*, Hemisphere Pub. Corp., NY, (1989) 155–160; U.S. Pat. No. 4,540,753; Verstrate et al., *Macromolecules*, vol. 21, (1988) 3360; and references cited therein.

"Tab swell" is a measure of the tendency of a resin to expand beyond the die diameter as parisons are formed in a bottle blowmolding process. While operating the blowmolding machine under reproducible conditions, tab swell is determined by measuring the width of the bottom tab where it meets the base of the blown bottle with a caliper. Using a Uniloy blowmolding apparatus, for example, the Uniloy blowmolding machine is first started up on a standard resin to ensure that the system is in control before taking a sample tab swell measurement. The Uniloy operating parameters are set to standard ranges to ensure a consistent measurement basis from sample to sample. These parameters include barrel temperature profiles, cycle time, and bottle weight. Tab swell is determined by taking five tab swell measurements from each head on the blowmolding machine for a given polymer sample. The average swell is then computed from each head, which is then averaged for a final reported tab swell value for the resin sample. Tab swell measurements can be made on resin powder or pellets, as desired.

Methods of the invention include obtaining a regression model for determining a polymer product property, the regression model including principal component loadings and principal component scores; acquiring a Raman spectrum of a polymer sample; calculating a new principal component score from at least a portion of the Raman spectrum and the principal component loadings; and calculating the polymer product property by applying the new principal component score to the regression model. The Raman spectra acquired for model development can be acquired on-line, via the sampling system described above, or can be acquired via off-line, laboratory measurements.

The regression model is preferable a locally weighted regression (LWR) model, using principal component analysis (PCA) eigenvectors. PCA is a well-known analytical method, and is described, for example, in Pirouette™ Multivariate Data Analysis for Windows software manual, Infometrix, Inc, Woodinville, Wash. (1985–2000), PLS_Toolbox™ software manual, Eigenvector Research, Inc., Manson, Wash. (1998), and references cited therein. LWR is described, for example, in Naes and Isaksson, *Analytical Chemistry*, 62, 664–673 (1990), Sekulic et al., *Analytical Chemistry*, 65, 835A-845A (1993), and references cited therein.

Principal Components Analysis is a mathematical method which forms linear combinations of raw variables to construct a set of mutually orthogonal eigenvectors (principal component loadings). Since the eigenvectors are mutually orthogonal, these new variables are uncorrelated. Further, PCA can calculate the eigenvectors in order of decreasing variance. Although the analysis computes a number of eigenvectors equal to the number of original variables, in practice, the first few eigenvectors capture a large amount of the sample variance. Thus, only a relatively small number of eigenvectors is needed to adequately capture the variance, and a large number of eigenvectors capturing minimal variance can be disregarded, if desired.

The data are expressed in an m (row) by n (column) matrix X, with each sample being a row and each variable a column optionally mean centered, autoscaled, scaled by another function or not scaled. The covariance of the data matrix, cov(X), can be expressed as:

$$cov(X) = X^T X/(m-1)$$

where the superscript T indicates the transpose matrix. The PCA analysis decomposes the data matrix as a linear combination of principal component scores vectors $S_i$ and principal component loading vectors (eigenvectors) $L_i$, as follows:

$$X = S_1 L_1^T + S_2 L_2^T + S_3 L_2^T +$$

The eigenvectors $L_i$ are eigenvectors of the covariance matrix, with the corresponding eigenvalues $\lambda_i$ indicating the relative amount of covariance captured by each eigenvector. Thus, the linear combination can be truncated after the sum of the remaining eigenvalues reaches an acceptably small value.

A model can be constructed correlating the Raman scattering intensity with a polymer property in PCA space using various linear or nonlinear mathematical models, such as principal components regression (PCR), partial least squares (PLS), projection pursuit regression (PPR), alternating conditional expectations (ACE), multivariate adaptive regression splines (MARS), and neural networks (NN), to name a few.

In a particular embodiment, the model is a locally weighted regression model. Locally Weighted Regression (LWR) assumes that a smooth non-linear function can be approximated by a linear or relatively simple non-linear (such as quadratic) function, with only the closest data points being used in the regression. The q closest points are used and are weighted by proximity, and the regression model is applied to the locally weighted values.

In the calibration phase, Raman spectra are acquired (on- or off-line), and the polymer properties of the sample are measured in the laboratory. The properties measured include those that the model will predict, such as density, melt flow rates, molecular weights, molecular weight distributions, tab swell, and functions thereof. For a desired polymer property, the data set including the measured polymer properties the samples and the Raman spectral data for the samples is decomposed into PCA space to obtain a calibration data set. No particular number of calibration samples is required. One skilled in the art can determine the appropriate number of calibration samples based on the performance of the model and the incremental change in performance with additional calibration data. Similarly, there is no particular number of PCA eigenvectors required, and one skilled in the art can choose an appropriate number based on the amount of variance captured a selected number of eigenvectors and the incremental effect of additional eigenvectors.

The LWR model can be validated using methods known in the art. It is convenient to divide the calibration samples into two sets: a calibration data set, and a validation data set. The calibration data set is used to develop the model, and to predict the appropriate polymer property for the samples in the validation data set, using the validation data set Raman spectra. Since the chosen polymer property for the validation data set samples is both calculated and measured, the effectiveness of the model can be evaluated by comparing the calculated and measured values.

The validated model can then be applied to spectra collected on-line (in the slurry reactor system) to predict the desired polymer property or properties.

If desired, a single model can be used to predict two or more polymer properties. Preferably, separate models are developed for each polymer property. Thus, in one embodiment, the present invention includes: obtaining a first regression model for determining a first polymer property, the first regression model including first principal component loadings and first principal component scores; obtaining a second regression model for determining a second polymer property, the second regression model including second principal component loadings and second principal component scores; acquiring a Raman spectrum of the polymer product in the slurry reactor system; calculating a new first principal component score from at least a portion of the Raman spectrum and the first principal component loadings; calculating a new second principal component score from at least a portion of the Raman spectrum and the second principal component loadings; calculating the first polymer property by applying the new first principal component score to the first regression model; and calculating the second polymer property by applying the new second principal component score to the second regression model.

Of course, more than two polymer properties can be determined by including third or more regression models. Advantageously, multiple polymer properties can be determined essentially simultaneously by using the same Raman spectrum and applying several regression models to the spectral data.

In a particular embodiment, two regression models are used, and both a melt flow rate (such as melt index $I_{2.16}$ or flow index $I_{21.6}$) and density are determined.

In another embodiment, three regression models are used, and a melt flow rate (such as melt index $I_{2.16}$ or flow index $I_{21.6}$), density and tab swell are determined.

6.5 Reaction Control

In one embodiment, the calculated polymer product property is compared to a target polymer product property, and at least one reactor parameter is adjusted based on the deviation between the calculated and target polymer product properties. The at least one reactor parameter can include the amounts of monomer, comonomer, catalyst and cocatalyst, the operating temperature of the reactor, the ratio of comonomer(s) to monomer, the ratio of hydrogen to monomer or comonomer, and other parameters that affect the chosen polymer property. For example, if the chosen polymer property is density and the density calculated from the PCA/LWR model is lower than a target density, a reactor parameter can be adjusted to increase density, such as, for example, reducing the comonomer feed rate and/or increasing the monomer feed rate.

For example, in the case of olefin polymerization, hydrogen can serve as a chain transfer agent. In this way, the molecular weight of the polymer product can be controlled. Additionally, varying the hydrogen concentration in olefin polymerization reactors can also vary the polymer melt flow rate, such as the melt index $I_{2.16}$ (MI). The present invention allows control of the reactor to produce polymer having a selected MI range. This is accomplished by knowing the relationship between hydrogen concentration and the MI of polymers produced by a specific reactor, and programming the target MI or MI range into a reactor control system processor. By monitoring the polymer MI data generated by the Raman analyzer and comparing this data to the target MI range, the flow of hydrogen into the reactor vessel may be adjusted so that the MI range of the polymer product remains within the target MI range.

It will be understood by those skilled in the art that other reactor constituent properties and other reactor parameters can be used. In a similar way as described above, the final polymer properties may be achieved by controlled metering reactor parameters in response to data generated by the Raman analyzer.

7. EXAMPLES

Laboratory determinations of density (g/cm$^3$) used a compression molded sample, cooled at 15° C. per hour and conditioned for 40 hours at room temperature according to ASTM D1505 and ASTM D1928, procedure C.

Laboratory determinations of melt flow rates were carried out at 190° C. according to ASTM D-1238. $I_{21.6}$ is the "flow index" or melt flow rate of the polymer measured according to ASTM D-1238, condition F, and $I_{2.16}$ is the "melt index" or melt flow rate of the polymer measured according to ASTM D-1238, condition E. The ratio of $I_{21.6}$ to $I_{2.16}$ is the "melt flow ratio" or "MFR".

Examples 1–2

Examples 1–2 were used to show the feasibility of embodiments of the invention. In Examples 1–2, measurements were made in the laboratory, simulating the measurements that would be made on-line in a polymerization reactor.

The Raman system used for Examples 1–2 was a Kaiser Optical Holoprobe Process Raman Analyzer, available from Kaiser Optical Systems, Inc., Ann Arbor, Mich. The Raman system used a 125 mW diode laser operating at 785 nm, and was equipped with a probe with 2.5 (6.3 cm) inch imaging optics fiber-optically coupled to the instrument, a holographic notch filter, holographic dispersion grating, cooled CCD detector (−40° C.), and computer for analyzer control and data analysis. A more complete description of this commercial instrument can be found in "Electro-Optic, Integrated Optic, and Electronic Technologies for Online Chemical Process Monitoring," *Proceedings SPIE*, vol. 3537, pp. 200–212 (1998), the disclosure of which is incorporated herein by reference for purposes of U.S. patent practice.

Data collection was accomplished by positioning the Raman probe above the surface of a polymer granule sample at a distance of about 2.5 inches (6.3 cm). The probe was fiber optically coupled to the Raman analyzer for both excitation and scattering signals. Data were collected from each sample for three minutes (i.e., signal averaged for 3 minutes). The CCD detector is sensitive to cosmic rays, which can cause spurious signals in array elements. "Cosmic ray checking" is a detector function that checks for these artifacts and discards them. In the following examples, the cosmic ray checking function was used.

Raman spectra were collected over the region of 100 to 3500 cm$^{-1}$. Three consecutive spectra were collected for each sample used. The samples were obtained from a slurry loop polymerization reactor producing high density polyethylene using Phillips catalysts. Laboratory measurements of melt index and/or density were also made for each sample.

The data were divided into calibration sets, used to develop the PCA/LWR models, and validation sets, used to evaluate the accuracy of the model. Separate models were developed for melt index and density.

Example 1

Melt Index

Eighty-five polymer samples were used. Each sample was an HDPE resin, in a melt index range of from about 0.35 to about 0.65 g/10 min, and a density range of about 0.952 to 0.963 g/cm$^3$. Raman spectra and laboratory melt index measurements were collected as described above.

Figure 3:
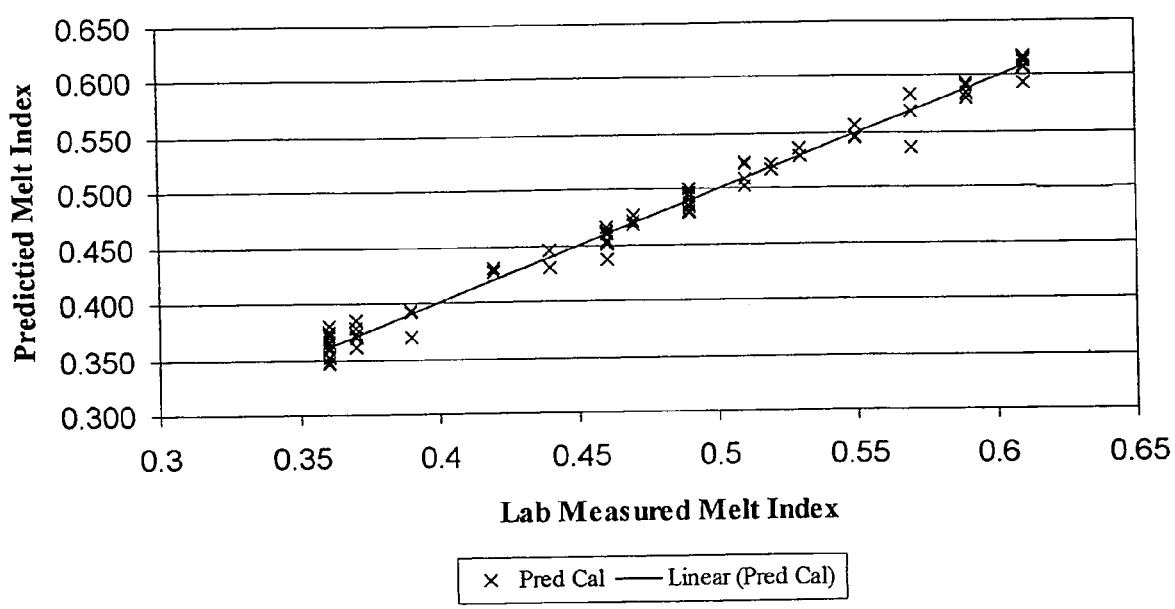
FIG. 3 shows predicted versus measured melt indices according to Example 1.

The lab values of melt index and the corresponding Raman spectra were used to create a locally-weighted regression model for melt index, using principal component loadings and principal component scores. The measured values of melt index (i.e., values obtained according to ASTM D-1238, condition 190° C., 2.16 kg), predicted values of melt index obtained from the model, and deviation (predicted minus measured, denoted "Δ MI") are shown in Table 1. The results are also shown graphically in FIG. 3. The line in the Figure is the model prediction. The calculated R$^2$ value was 0.994, with a standard error of 0.01 g/10 min.

TABLE 1

Melt Index Calibration

| MI (Lab) (dg/min) | MI (Model) (dg/min) | Δ MI (dg/min) |
|---|---|---|
| 0.59 | 0.591 | 0.001 |
| 0.59 | 0.590 | 0.000 |
| 0.59 | 0.581 | −0.009 |
| 0.52 | 0.523 | 0.003 |
| 0.52 | 0.517 | −0.003 |
| 0.52 | 0.523 | 0.003 |
| 0.37 | 0.373 | 0.003 |
| 0.37 | 0.369 | −0.001 |
| 0.37 | 0.378 | 0.008 |
| 0.37 | 0.384 | 0.014 |
| 0.37 | 0.361 | −0.009 |
| 0.61 | 0.594 | −0.016 |
| 0.61 | 0.617 | 0.007 |
| 0.61 | 0.617 | 0.007 |
| 0.55 | 0.547 | −0.003 |
| 0.55 | 0.545 | −0.005 |
| 0.55 | 0.556 | 0.006 |
| 0.36 | 0.348 | −0.012 |
| 0.36 | 0.351 | −0.009 |
| 0.36 | 0.371 | 0.011 |
| 0.59 | 0.586 | −0.004 |
| 0.59 | 0.584 | −0.006 |
| 0.59 | 0.594 | 0.004 |
| 0.59 | 0.592 | 0.002 |
| 0.36 | 0.360 | 0.000 |
| 0.36 | 0.350 | −0.010 |
| 0.36 | 0.375 | 0.015 |
| 0.36 | 0.365 | 0.005 |
| 0.42 | 0.427 | 0.007 |
| 0.42 | 0.431 | 0.011 |
| 0.42 | 0.431 | 0.011 |
| 0.44 | 0.446 | 0.006 |
| 0.44 | 0.431 | −0.009 |
| 0.46 | 0.460 | 0.000 |
| 0.46 | 0.438 | −0.022 |
| 0.46 | 0.454 | −0.006 |
| 0.39 | 0.393 | 0.003 |
| 0.39 | 0.370 | −0.020 |
| 0.39 | 0.391 | 0.001 |
| 0.46 | 0.463 | 0.003 |
| 0.46 | 0.451 | −0.009 |
| 0.46 | 0.461 | 0.001 |
| 0.36 | 0.380 | 0.020 |
| 0.36 | 0.367 | 0.007 |
| 0.36 | 0.373 | 0.013 |
| 0.57 | 0.536 | −0.034 |
| 0.57 | 0.569 | −0.001 |
| 0.57 | 0.584 | 0.014 |
| 0.49 | 0.479 | −0.011 |
| 0.49 | 0.498 | 0.008 |
| 0.49 | 0.495 | 0.005 |
| 0.49 | 0.484 | −0.006 |
| 0.49 | 0.481 | −0.009 |
| 0.49 | 0.487 | −0.003 |
| 0.46 | 0.451 | −0.009 |
| 0.46 | 0.467 | 0.007 |
| 0.46 | 0.452 | −0.008 |
| 0.49 | 0.494 | 0.004 |
| 0.49 | 0.493 | 0.003 |
| 0.49 | 0.493 | 0.003 |
| 0.49 | 0.501 | 0.011 |
| 0.49 | 0.493 | 0.003 |
| 0.49 | 0.485 | −0.005 |
| 0.47 | 0.471 | 0.001 |
| 0.47 | 0.477 | 0.007 |
| 0.47 | 0.467 | −0.003 |
| 0.51 | 0.522 | 0.012 |
| 0.51 | 0.509 | −0.001 |
| 0.51 | 0.501 | −0.009 |
| 0.36 | 0.369 | 0.009 |
| 0.36 | 0.361 | 0.001 |
| 0.36 | 0.359 | −0.001 |
| 0.36 | 0.358 | −0.002 |
| 0.51 | 0.509 | −0.001 |
| 0.51 | 0.503 | −0.007 |
| 0.51 | 0.524 | 0.014 |
| 0.36 | 0.346 | −0.014 |
| 0.36 | 0.359 | −0.001 |
| 0.36 | 0.353 | −0.007 |
| 0.61 | 0.610 | 0.000 |
| 0.61 | 0.614 | 0.004 |
| 0.61 | 0.607 | −0.003 |
| 0.61 | 0.612 | 0.002 |
| 0.53 | 0.530 | 0.000 |
| 0.53 | 0.537 | 0.007 |

Example 2

Density

Figure 4:
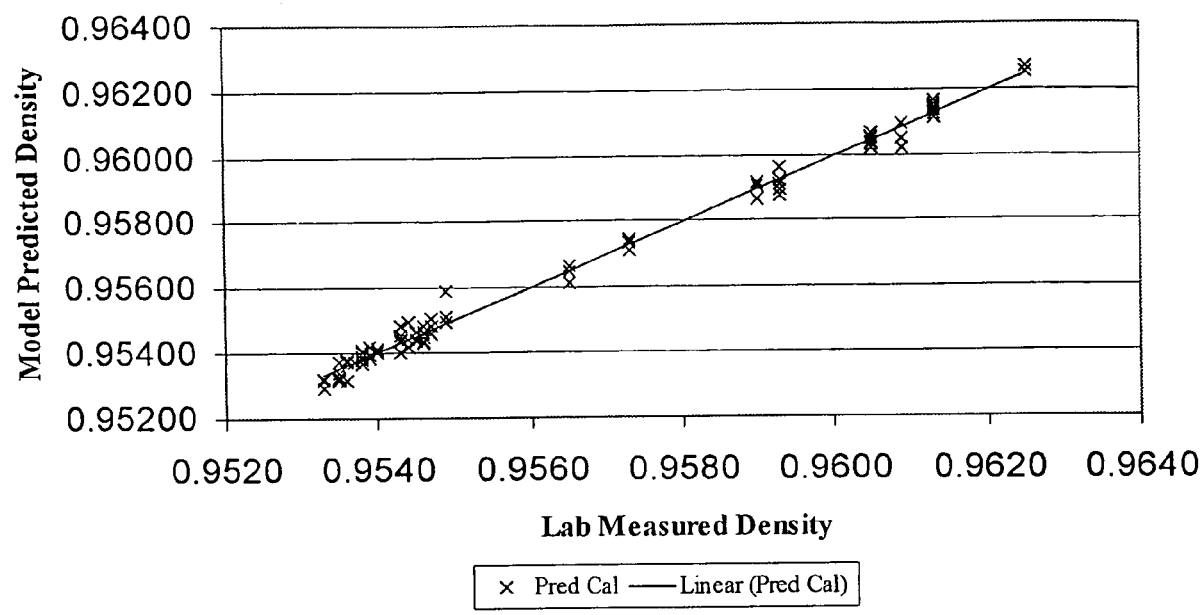
FIG. 4 shows predicted versus measured density according to Example 2.

An analysis was carried out as in Example 1, using density rather than melt index as the predicted property. The same samples as in Example 1 were evaluated. Raman spectra and laboratory density measurements were collected as described above. The lab values of density (i.e., measured in accordance with ASTM D1505 and ASTM D1928, procedure C) and the corresponding Raman spectra were used to create a locally-weighted regression model for density, using principal component loadings and principal component scores. The measured densities, predicted densities, and deviations (i.e., predicted minus measured densities, denoted "Δρ") are shown in Table 2. The results are also shown graphically in FIG. 4. The line in the Figure is the model prediction. The calculated $R^2$ value was 0.997, with a standard error of 0.0003 g/cm$^3$.

TABLE 2

Density Calibration

| ρ (Lab) (g/cm³) | ρ (Model) (g/cm³) | Δρ (g/cm³) | ρ (Lab) (g/cm³) | ρ (Model) (g/cm³) | Δρ (g/cm³) |
|---|---|---|---|---|---|
| 0.9547 | 0.95480 | 0.00010 | 0.9609 | 0.96098 | 0.00008 |
| 0.9547 | 0.95457 | −0.00013 | 0.9609 | 0.96051 | −0.00039 |
| 0.9547 | 0.95502 | 0.00032 | 0.9565 | 0.95667 | 0.00017 |
| 0.9546 | 0.95463 | 0.00003 | 0.9565 | 0.95646 | −0.00004 |
| 0.9546 | 0.95458 | −0.00002 | 0.9565 | 0.95613 | −0.00037 |
| 0.9546 | 0.95430 | −0.00030 | 0.9535 | 0.95371 | 0.00021 |
| 0.9593 | 0.95923 | −0.00007 | 0.9535 | 0.95320 | −0.00030 |
| 0.9593 | 0.95911 | −0.00019 | 0.9535 | 0.95336 | −0.00014 |
| 0.9593 | 0.95895 | −0.00035 | 0.9543 | 0.95401 | −0.00029 |
| 0.9593 | 0.95877 | −0.00053 | 0.9543 | 0.95450 | 0.00020 |
| 0.9593 | 0.95966 | 0.00036 | 0.9543 | 0.95440 | 0.00010 |
| 0.9544 | 0.95495 | 0.00055 | 0.9538 | 0.95389 | 0.00009 |
| 0.9544 | 0.95440 | 0.00000 | 0.9538 | 0.95369 | −0.00011 |
| 0.9544 | 0.95418 | −0.00022 | 0.9538 | 0.95409 | 0.00029 |
| 0.9543 | 0.95451 | 0.00021 | 0.9545 | 0.95463 | 0.00013 |
| 0.9543 | 0.95482 | 0.00052 | 0.9545 | 0.95442 | −0.00008 |
| 0.9543 | 0.95438 | 0.00007 | 0.9545 | 0.95435 | −0.00015 |
| 0.9625 | 0.96270 | 0.00020 | 0.9546 | 0.95480 | 0.00020 |
| 0.9625 | 0.96270 | 0.00020 | 0.9546 | 0.95437 | −0.00023 |
| 0.9625 | 0.96252 | 0.00002 | 0.9546 | 0.95449 | −0.00011 |
| 0.9573 | 0.95732 | 0.00002 | 0.9533 | 0.95292 | −0.00038 |
| 0.9573 | 0.95740 | 0.00010 | 0.9533 | 0.95316 | −0.00014 |
| 0.9573 | 0.95714 | −0.00016 | 0.9533 | 0.95318 | −0.00012 |
| 0.9573 | 0.95748 | 0.00018 | 0.9536 | 0.95314 | −0.00046 |
| 0.9605 | 0.96068 | 0.00018 | 0.9536 | 0.95375 | 0.00015 |
| 0.9605 | 0.96047 | −0.00003 | 0.9536 | 0.95378 | 0.00018 |
| 0.9605 | 0.96036 | −0.00014 | 0.9613 | 0.96112 | −0.00018 |
| 0.9605 | 0.96024 | −0.00026 | 0.9613 | 0.96136 | 0.00006 |

TABLE 2-continued

Density Calibration

| ρ (Lab) (g/cm$^3$) | ρ (Model) (g/cm$^3$) | Δρ (g/cm$^3$) | ρ (Lab) (g/cm$^3$) | ρ (Model) (g/cm$^3$) | Δρ (g/cm$^3$) |
|---|---|---|---|---|---|
| 0.9605 | 0.96031 | −0.00019 | 0.9613 | 0.96144 | 0.00014 |
| 0.9605 | 0.96054 | 0.00004 | 0.9613 | 0.96147 | 0.00017 |
| 0.9605 | 0.96023 | −0.00027 | 0.9538 | 0.95384 | 0.00004 |
| 0.9537 | 0.95373 | 0.00003 | 0.9538 | 0.95403 | 0.00023 |
| 0.9537 | 0.95369 | −0.00001 | 0.9538 | 0.95376 | −0.00004 |
| 0.9549 | 0.95511 | 0.00021 | 0.9613 | 0.96164 | 0.00034 |
| 0.9549 | 0.95589 | 0.00099 | 0.9613 | 0.96124 | −0.00006 |
| 0.9549 | 0.95491 | 0.00001 | 0.9613 | 0.96153 | 0.00023 |
| 0.9590 | 0.95865 | −0.00035 | 0.9540 | 0.95412 | 0.00012 |
| 0.9590 | 0.95906 | 0.00006 | 0.9540 | 0.95402 | 0.00002 |
| 0.9590 | 0.95919 | 0.00019 | 0.9540 | 0.95404 | 0.00004 |
| 0.9539 | 0.95386 | −0.00004 | 0.9540 | 0.95406 | 0.00006 |
| 0.9539 | 0.95418 | 0.00028 | 0.9535 | 0.95329 | −0.00021 |
| 0.9539 | 0.95393 | 0.00003 | 0.9535 | 0.95317 | −0.00033 |
| 0.9609 | 0.96020 | −0.00070 | | | |

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. A process for determining polymer product properties in a slurry reactor system, the process comprising:
    (a) obtaining a regression model for determining a polymer product property, the regression model including principal component loadings and principal component scores;
    (b) acquiring a Raman spectrum of the polymer product in the slurry reactor system;
    (c) calculating a new principal component score from at least a portion of the Raman spectrum and the principal component loadings; and
    (d) calculating the polymer product property by applying the new principal component score to the regression model.

2. The process of claim 1, wherein the step of obtaining a regression model comprises:
    (i) obtaining a plurality of Raman spectra of the polymer product;
    (ii) calculating principal component loadings and principal component scores from the spectra obtained in (i) using principal component analysis (PCA); and
    (iii) forming the regression model using the principal component scores calculated in (ii) such that the regression model correlates the polymer property to the principal component scores.

3. The process of claim 1, wherein the regression model is a locally weighted regression model.

4. The process of claim 1, wherein the polymer product property is selected from density, melt flow rate, molecular weight, molecular weight distribution, tab swell, and functions thereof.

5. The process of claim 1, wherein the polymer product comprises polyolefin particles.

6. The process of claim 1, wherein the step of acquiring a Raman spectrum comprises:
    (i) providing a Raman probe in optical communication with the polymer product in the slurry reactor system; and
    (ii) irradiating the polymer product and collecting scattered radiation using the Raman probe.

7. The process of claim 1, wherein the slurry reactor system is a slurry loop reactor system.

8. The process of claim 1, wherein the slurry reactor system is a stirred slurry reactor system.

9. The process of claim 1, further comprising:
    (i) obtaining a second regression model for determining a second property of the polymer product, the second regression model including second principal component loadings and second principal component scores;
    (ii) calculating a new second principal component score from at least a portion of the Raman spectrum and the second principal component loadings; and
    (iii) calculating the second property of the polymer product by applying the new second principal component score to the second regression model.

10. The process of claim 9, wherein the two properties of the polymer product are a melt flow rate and density.

11. The process of claim 9, further comprising:
    (i) obtaining a third regression model for determining a third property of the polymer product, the third regression model including third principal component loadings and third principal component scores;
    (ii) calculating a new third principal component score from at least a portion of the Raman spectrum and the third principal component loadings; and
    (iii) calculating the third property of the polymer product by applying the new third principal component score to the third regression model.

12. The process of claim 11, wherein the three properties of the polymer product are a melt flow rate, density, and tab swell.

13. A process for determining polyolefin product properties in a slurry loop reactor system, the process comprising:
    (a) obtaining a locally weighted regression model for determining a polyolefin product property selected from density, melt flow rate, molecular weight, molecular weight distribution, tab swell, and functions thereof, the locally weighted regression model including principal component loadings and principal component scores;
    (b) acquiring a Raman spectrum of a the polyolefin product in the slurry loop reactor;
    (c) calculating a new principal component score from at least a portion of the Raman spectrum and the principal component loadings; and
    (d) calculating the polyolefin product property by applying the new principal component score to the locally weighted regression model.

14. The process of claim 13, wherein the step of obtaining a regression model comprises:
    (i) obtaining a plurality of Raman spectra of the polyolefin product;
    (ii) calculating principal component loadings and principal component scores from the spectra obtained in (i) using principal component analysis (PCA); and
    (iii) forming the regression model using the principal component scores calculated in (ii) such that the regression model correlates the polyolefin product property to the principal component scores.

15. The process of claim 13, wherein the step of acquiring a Raman spectrum comprises:
    (i) providing a Raman probe in optical communication with the polyolefin product in the slurry reactor system; and (ii) irradiating the sample and collecting scattered radiation using the Raman probe.

16. The process of claim 13, further comprising:
   (i) obtaining a second regression model for determining a second property of the polyolefin product, the second regression model including second principal component loadings and second principal component scores;
   (ii) calculating a new second principal component score from at least a portion of the Raman spectrum and the second principal component loadings; and
   (iii) calculating the second property of the polyolefin product by applying the new second principal component score to the second regression model.

17. The process of claim 16, wherein the two properties of the polyolefin product are a melt flow rate and density.

18. The process of claim 16, further comprising:
   (i) obtaining a third regression model for determining a third property of the polyolefin product, the third regression model including third principal component loadings and third principal component scores;
   (ii) calculating a new third principal component score from at least a portion of the Raman spectrum and the third principal component loadings; and
   (iii) calculating the third property of the polyolefin product by applying the new third principal component score to the third regression model.

19. The process of claim 18, wherein the three properties of the polyolefin product are a melt flow rate, density, and tab swell.

20. A process for controlling polymer properties in a slurry reactor system, the process comprising:
   (a) obtaining a regression model for determining a polymer product property, the regression model including principal component loadings and principal component scores;
   (b) acquiring a Raman spectrum of the polymer product in the slurry reactor system;
   (c) calculating a new principal component score from at least a portion of the Raman spectrum and the principal component loadings;
   (d) calculating the polymer product property by applying the new principal component score to the regression model; and
   (e) adjusting at least one polymerization parameter based on the calculated polymer product property.

21. The process of claim 20, wherein the step of obtaining a regression model comprises:
   (i) obtaining a plurality of Raman spectra of the polymer product;
   (ii) calculating principal component loadings and principal component scores from the spectra obtained in (i) using principal component analysis (PCA); and
   (iii) forming the regression model using the principal component scores calculated in (ii) such that the regression model correlates the polymer product property to the principal component scores.

22. The process of claim 20, wherein the regression model is a locally weighted regression model.

23. The process of claim 20, wherein the polymer product property is selected from density, melt flow rate, molecular weight, molecular weight distribution, tab swell, and functions thereof.

24. The process of claim 20, wherein the polymer product comprises polyolefin particles.

25. The process of claim 24, wherein the step of acquiring a Raman spectrum comprises:
   (i) providing a Raman probe in optical communication with the polymer product in the slurry reactor system; and
   (ii) irradiating the polymer product and collecting scattered radiation using the Raman probe.

26. The process of claim 20, wherein the slurry reactor system is a slurry loop reactor system.

27. The process of claim 20, wherein the slurry reactor system is a stirred slurry reactor system.

28. The process of claim 20, wherein the at least one polymerization parameter is selected from the group consisting of monomer feed rate, comonomer feed rate, catalyst feed rate, hydrogen gas feed rate, slurry density, and reaction temperature.

29. The process of claim 20, further comprising:
   (i) obtaining a second regression model for determining a second property of the polymer product, the second regression model including second principal component loadings and second principal component scores;
   (ii) calculating a new second principal component score from at least a portion of the Raman spectrum and the second principal component loadings; and
   (iii) calculating the second property of the polymer product by applying the new second principal component score to the second regression model,
   and wherein the step of adjusting comprises adjusting at least one polymerization parameter based on the calculated property of the polymer product, the calculated second property of the polymer product, or both calculated polymer product properties.

30. The process of claim 29, wherein the two properties of the polymer product are a melt flow rate and density.

31. The process of claim 29, further comprising:
   (i) obtaining a third regression model for determining a third property of the polymer product, the third regression model including third principal component loadings and third principal component scores;
   (ii) calculating a new third principal component score from at least a portion of the Raman spectrum and the third principal component loadings; and
   (iii) calculating the third property of the polymer product by applying the new third principal component score to the third regression model,
   and wherein the step of adjusting comprises adjusting at least one polymerization parameter based on the calculated property of the polymer product, the calculated second property of the polymer product, the calculated third property of the polymer product, or a combination thereof.

32. The process of claim 31, wherein the three properties of the polymer product are a melt flow rate, density, and tab swell.

33. A process for controlling polyolefin product properties in a slurry loop reactor system, the process comprising:
   (a) obtaining a locally weighted regression model for determining a polyolefin product property selected from density, melt flow rate, molecular weight, molecular weight distribution, tab swell, and functions thereof, the locally weighted regression model including principal component loadings and principal component scores;
   (b) acquiring a Raman spectrum of the polyolefin product in the slurry loop reactor system;
   (c) calculating a new principal component score from at least a portion of the Raman spectrum and the principal component loadings;
   (d) calculating the polyolefin product property by applying the new principal component score to the locally weighted regression model; and
   (e) adjusting at least one polymerization parameter based on the calculated polyolefin product property.

34. The process of claim 33, wherein the step of obtaining a regression model comprises:
(i) obtaining a plurality of Raman spectra of the polyolefin product;
(ii) calculating principal component loadings and principal component scores from the spectra obtained in (i) using principal component analysis (PCA); and
(iii) forming the regression model using the principal component scores calculated in (ii) such that the regression model correlates the polyolefin product property to the principal component scores.

35. The process of claim 33, wherein the step of acquiring a Raman spectrum comprises:
(i) providing a Raman probe in optical communication with the polyolefin polymer product in the slurry loop reactor system; and
(ii) irradiating the sample and collecting scattered radiation using the Raman probe.

36. The process of claim 33, wherein the at least one polymerization parameter is selected from the group consisting of monomer feed rate, comonomer feed rate, catalyst feed rate, hydrogen gas feed rate, slurry density, and reaction temperature.

37. The process of claim 33, further comprising:
(i) obtaining a second regression model for determining a second property of the polyolefin product, the second regression model including second principal component loadings and second principal component scores;
(ii) calculating a new second principal component score from at least a portion of the Raman spectrum and the second principal component loadings; and
(iii) calculating the second property of the polyolefin product by applying the new second principal component score to the second regression model, and wherein the step of adjusting comprises adjusting at least one polymerization parameter based on the calculated property of the polyolefin product, the calculated second property of the polyolefin product, or both calculated polyolefin product properties.

38. The process of claim 37, wherein the two properties of the polyolefin product are a melt flow rate and density.

39. The process of claim 37, further comprising:
(i) obtaining a third regression model for determining a third property of the polyolefin product, the third regression model including third principal component loadings and third principal component scores;
(ii) calculating a new third principal component score from at least a portion of the Raman spectrum and the third principal component loadings; and
(iii) calculating the third property of the polyolefin product by applying the new third principal component score to the third regression model, and wherein the step of adjusting comprises adjusting at least one polymerization parameter based on the calculated property of the polyolefin product, the calculated second property of the polyolefin product, the calculated third property of the polyolefin product, or a combination thereof.

40. The process of claim 30, wherein the three properties of the polyolefin product are a melt flow rate, density, and tab swell.

* * * * *